B. L. ROWLEY.

Bit for Bridle.

No. 6,656. Reissued Sept. 21, 1875.

*Witnesses:*

Joseph Coulb

Fred K. Crane

*Inventor:*

Burdett L. Rowley

N. PETERS, PHOTO-LITHOGRAPHER, WASHINGTON, D. C.

UNITED STATES PATENT OFFICE.

BEST AVAILABLE COPY

BURDETT L. ROWLEY, OF NEW BRITAIN, CONNECTICUT.

IMPROVEMENT IN BITS FOR BRIDLES.

Specification forming part of Letters Patent No. 76,821, dated April 14, 1868; reissue No. 6,656, dated September 21, 1875; application filed August 9, 1875.

*o all whom it may concern:*

Be it known that I, BURDETT L. ROWLEY, New Britain, in the county of Hartford and tate of Connecticut, have made a new and seful Improvement in Bits for Bridles; and hereby declare the following to be a full and xact description of the same, reference being ad to the accompanying drawings, which rm a part of this specification, in which—

Figure 1:
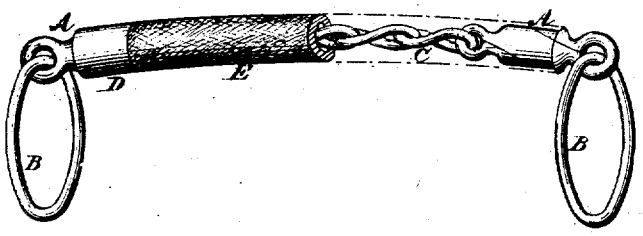
Figure 2:
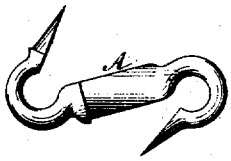
Figure 3:
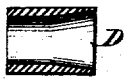

Figure 1 shows my invention applied to hat is known as a chain-bit or chain mouth-iece. Figs. 2 and 3 show devices for con-ecting the mouth-piece to the ring or cheek-iece.

It is frequently desirable to have a bridle-it with its surface covered with a soft elastic aterial, so as not to gall or injure the mouth the horse. This is especially the case with e chain-bit. This kind of bit has the merit being flexible; but the links, unless cov-red, are liable to injure the horse's mouth. eretofore this form of bits, and others, have een covered with leather. Owing to the in-uence of the saliva the leather is not durable, nd after being used it becomes stiff and ough. Bits, though not flexible bits, have lso been covered by slipping over them, so s to cover partially or wholly the portion in-de the cheek-piece, which passes through e horse's mouth, with a tube of rubber. This anner of covering is objectionable, for the ason that the tube, being only slipped over e bit, and the ends not fastened to the cheek-iece, is not attached to it, and therefore will rn upon the bit. The ends of the tube are lso loose, so that they can move in or out on e bit, so as to sometimes cover more and metimes less of the bit, and thus catch and inch the mouth of the horse.

My invention consists, first, in covering the outh-piece of a bridle-bit with a vulcanizable ompound of rubber, or its equivalent, and ulcanizing said compound upon the bit, so s to form a flexible compound of soft rubber overing upon the bit and fixed upon it. The xing of this compound upon the bit is effected y means of vulcanizing molds or presses, in e manner well understood by rubber-manu-facturers. The rubber compound is placed upon the bit where it is subjected to pressure, and what is known as the vulcanizing-heat.

The second part of my invention consists in attaching to each end of the mouth-piece a double eye and ferrule, the latter forming a smooth joint with the rubber surface, and in the case of a common rubber tube being used for the covering—acting as a stop to its abutting ends.

The third part of my invention consists in forming a flexible bit by means of a flexible mouth-piece, with a flexible covering of soft vulcanized rubber or equivalent gum.

In the drawing, A shows a double eye, (open in Fig. 2,) closed, but without the ferrule, on the right-hand side of Fig. 1, and with the ferrule on the left-hand side of Fig. 1. D, in Figs. 1 and 3, shows the ferrule, the office of which is to lock the double eye and form a smooth continuation to the rubber surface. The soft-rubber covering E is molded directly upon the mouth-piece C, which, if flexibility is desired, should be in the form of a chain, as shown in Fig. 1. By molding and vulcanizing the rubber directly upon the mouth-piece C of the bit it becomes permanently attached to the bit, and is forced close around and between the links of the chain, making the flexible bit of greater strength. It also prevents any moisture or saliva from entering between the rubber covering and the metal bit, thus preventing fouling and rusting, which is not the case when a simple tube is slipped over the bit, as practiced prior to my invention. This feature and the production of a flexible bit constitute the essentials of my invention.

I do not claim a hard-rubber covering molded upon a bit. The hard-rubber compound, while it may protect the metal of the bit, is nearly as hard to the horse's mouth as metal. It is also inapplicable to flexible bits.

Having thus described my invention, what I claim, and desire to secure by Letters Patent of the United States, is—

BEST AVAILABLE COPY

1. A bridle-bit, having a covering upon the mouth-piece of soft vulcanized compound, molded upon the bit and fixed thereon by heat, substantially as specified.

2. In a bridle-bit the combination of the covering of vulcanizable compound and the end ferrules or abutting pieces, substantially as described.

3. In a bridle-bit the combination of a cha or flexible mouth-piece, with a covering soft vulcanized rubber or gum, so as to for a flexible bit, substantially as specified.

BURDETT L. ROWLEY.

Witnesses:

JOSEPH COULT,

FREDK. CRANE.